J. N. HOFFMAN.
FRUIT AND VEGETABLE CLEANER AND POTATO SPROUTER.
APPLICATION FILED APR. 6, 1914.
1,128,981.
Patented Feb. 16, 1915.
2 SHEETS—SHEET 2.
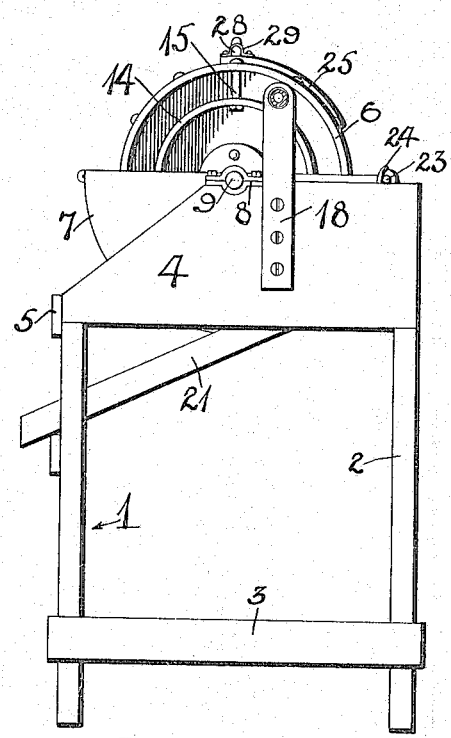
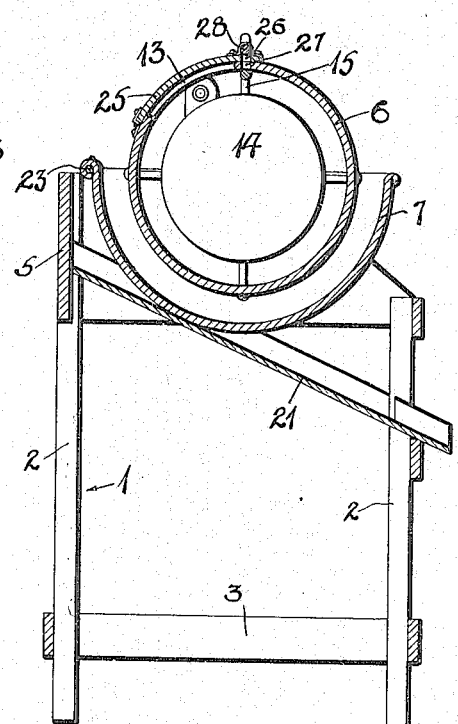
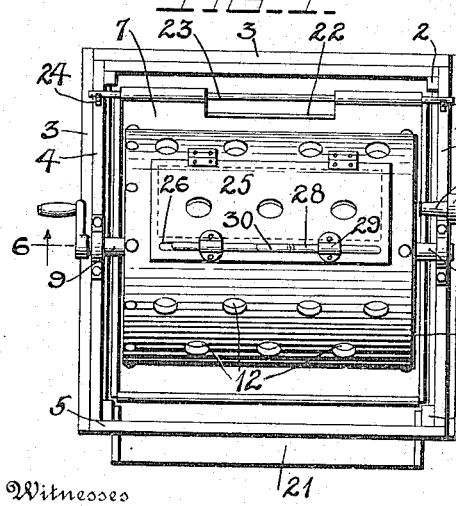
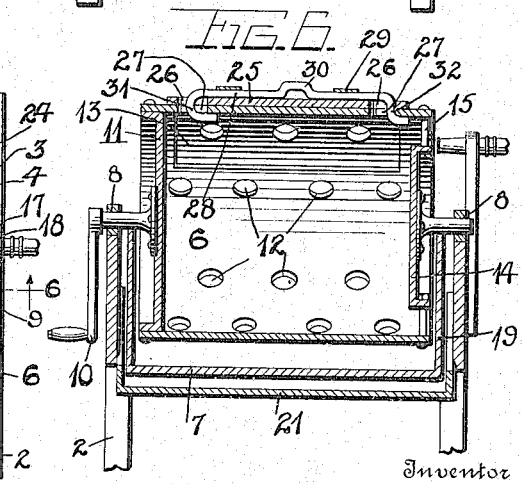
Witnesses
Edwin R. Hunt
Inventor
John N. Hoffman
By H. R. Willson &co.
Attorney

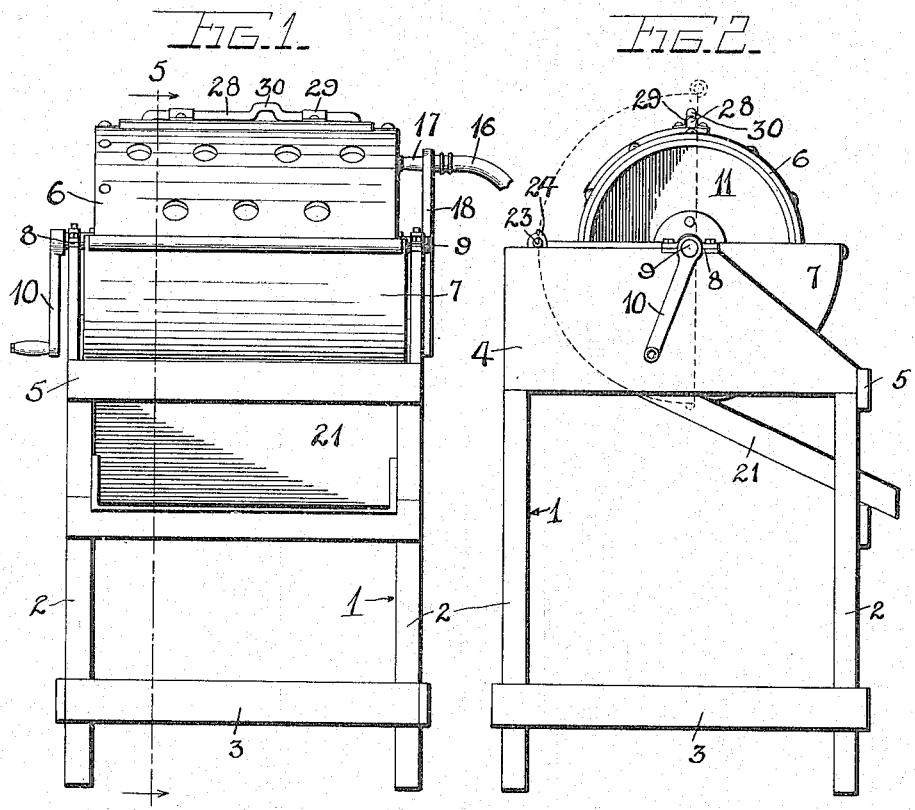
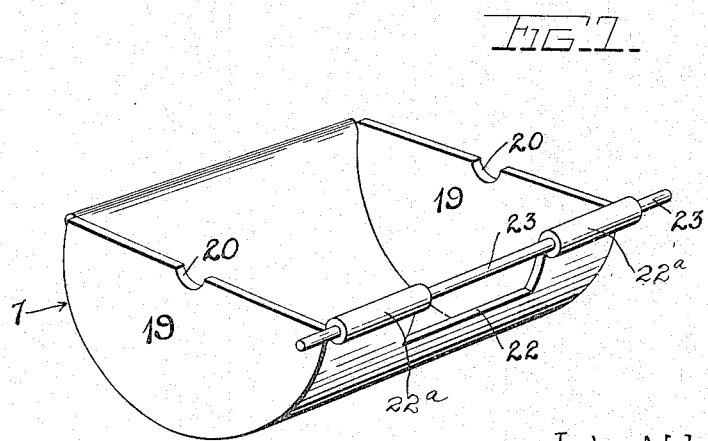

UNITED STATES PATENT OFFICE.

JOHN N. HOFFMAN, OF FOREST GROVE, OREGON.

FRUIT AND VEGETABLE CLEANER AND POTATO-SPROUTER.

1,128,981.            Specification of Letters Patent.      Patented Feb. 16, 1915.

Application filed April 6, 1914. Serial No. 829,944.

*To all whom it may concern:*

Be it known that I, JOHN N. HOFFMAN, a citizen of the United States, residing at Forest Grove, in the county of Washington and State of Oregon, have invented certain new and useful Improvements in Fruit and Vegetable Cleaners and Potato-Sprouters; and I do declare the following to be a full, clear, and exact description of the invention, such as will enable others skilled in the art to which it appertains to make and use the same.

My invention relates to cleaning devices for vegetables and fruit and has for its primary object to provide a simple device which will effectually wash fruit or vegetables and yet will require only a small amount of water.

A secondary object of the invention is to provide a device with means whereby water may be trapped within a revolving cylinder, to be described, and means whereby a continued flow of fresh water may be maintained, the trapping means being of such construction as to allow the water and mud collected therein, to be readily removed.

Still another object of the invention is to construct the device in the most simple manner consistent with the proper operation thereof.

With the above objects in view, the invention resides in certain novel features of construction and combination herein described and claimed and shown in the drawings wherein:

Figure 1 is a side elevation of the invention the water receptacle being shown in operative position; Fig. 2 is an end view of one end of the machine; Fig. 3 is a view of the opposite end, the water supply nozzle being in section; Fig. 4 is a plan view; Fig. 5 is a vertical transverse section taken upon the line 5—5 of Fig. 1; Fig. 6 is a detail longitudinal section taken upon line 6—6 of Fig. 4; and Fig. 7 is a detail perspective view of the water receptacle.

In the accompanying drawings, I have shown my invention as comprising an upright supporting frame 1, said frame comprising vertical legs or standards 2 which are connected at their lower ends by transverse and longitudinal bars 3, while their upper ends are connected by transverse end boards or plates 4 and longitudinal bars 5, a vegetable cleaning cylinder 6 revolubly supported upon the end boards 4, and a removable water receptacle or trough 7.

As clearly shown in Figs. 2 and 3, the end boards 4 have their forward corners beveled substantially at angles of 45 degrees, while their rear ends terminate even with the rear legs 2 and are connected by one of the longitudinal bars 5. The upper edges of the bars 4 are provided with alined bearings 8 in which stub shafts 9, projecting from the opposite ends of the cylinder 6, are revolubly mounted, one of said stub shafts being equipped with a hand crank 10, by means of which the entire cylinder or drum may be rotated.

The cylinder preferably comprises a solid end wall 11 which is provided, upon its periphery, with an out-turned flange which is riveted to the longitudinal wall of the cylinder, said wall being provided with a number of openings 12 which are preferably arranged in staggered relation and with a rectangular filling opening 13. The opposite end 14 of the cylinder is of less diameter than the annular wall thereof, said end wall having an out-turned flange through which and said annular wall, bolts 15 pass, thereby concentrically positioning the longitudinal wall of the cylinder. As clearly shown, one of the stub shafts 9 is carried by this end.

By the above described positioning of the end wall 14, it will be seen that a space remains between the periphery of said wall and the interior of the longitudinal portion of the cylinder, this space being provided for the admission of water flowing through a flexible tube 16, and a nozzle 17, said nozzle being rigidly supported in proper position by an upright arm 18 which rises from one of the end boards 4.

The above mentioned water receptacle 7 is here shown in the form of a semi-cylindrical trough, the opposite end walls 19 of said trough being notched as at 20 on their upper edges, said notches engaging the stub shafts 9 and preventing lateral shifting of said receptacle. When in position upon the remainder of the machine, the bottom of the receptacle 7 contacts with the upper face of an inclined chute 21 which is secured between the legs 2 and underlies the cylinder 6.

The rear wall of the receptacle 7 is provided with a longitudinal notch 22 which acts as a water overflow port and with a bead 22ª, a longitudinally extending rod 23 being secured in said bead and overlying said notch and thus constituting a hand grip, by means of which the receptacle 7 may be tilted for the purpose of discharging mud and water therefrom in a manner to appear. As clearly shown in Fig. 4, the opposite ends of the rod 23 project longitudinally from the opposite ends of the receptacle 7, said ends coacting with hooks 24 which rise from the end boards 4, thereby limiting the movement of said receptacle in one direction.

The opening 13 in the perforated cylinder 6 may be closed by any appropriate form of door, but said door is preferably in the form of a longitudinally curved plate 25 having one of its longitudinal edges hingedly connected to the cylinder, while its remaining edges overlap the material surrounding said opening. For the purpose of retaining the plates 25 in closed position, I provide the free longitudinal edge thereof with spaced slots 26, which, when the plate is closed, register with similar slots 27 formed in the portion of the cylinder underlying this part of the plate. The registering slots 26 and 27 are provided for the reception of keepers carried by the opposite ends of a longitudinal fastening rod 28 which is slidably mounted in suitable bearings 29 and has its central portion bulged upwardly as at 30 for the purpose of providing an operating handle.

One of the above mentioned keepers is in the form of a hook 31 which is formed by bending one end of the rod 28 substantially upon itself, while the remaining keeper is in the form of an offset longitudinal portion 32, this keeper being formed by merely bending this end of the rod 28 in a suitable manner. As clearly shown in Fig. 4, the bearings 29 are disposed between the slots 26 and the keepers 31 and 32 depend through said slots and the slots 27, when the plate or door is closed, whereupon longitudinal shifting of the rod 28, will cause said keepers to contact with the inner surface of the longitudinal wall of the cylinder, thereby preventing outward movement of said plate or door. Reversal of this movement will, of course, leave the door free to be swung outwardly.

In employing the device, the door or plate 25 is opened upon its hinges and the cylinder is partially filled with the fruit or vegetables to be cleaned, the door is then shut and the cylinder 6 set in motion by the crank 10, water, under pressure, being now allowed to discharge from the nozzle 17 into the interior of said cylinder. During this operation, the receptacle 7 is preferably tilted upwardly as shown in dotted lines in Fig. 2, thereby allowing the waste water and mud, to flow from the perforations in the cylinder, said mud and water now falling upon the chute 21 from which it may be discharged into a suitable receptacle (not shown). When the fruit or vegetables become fairly clean, the trough 7 is tilted until it underlies said cylinder, whereupon the water, flowing from the cylinder, will be trapped therein. When this water rises to the level of the notch 22, said notch will act as a discharge opening for conducting said water onto the chute 21. The water supply, coming through the nozzle 17, may now be cut off and the drum may be rotated within the body of water retained in the receptacle 7. When it becomes necessary to empty said receptacle, it is simply necessary to tilt the same as hereinbefore suggested.

I have described my invention with considerable minuteness and have set forth certain specific formations which are illustrated in the drawing. I do not wish, however, to be limited to any details of construction, proportioning and arrangement of parts or character of materials employed, otherwise than as set forth in the appended claims.

From the hereinbefore set forth features of construction, it will be readily seen that the device may be used to equal advantage for the purpose of peeling fruit or vegetables, hot water being used when the invention is employed for this purpose. It will further be seen that by proper manipulation of the device, it could be employed for the purpose of sprouting potatoes.

It will be clear that the drum or cylinder could be of any appropriate formation, provided it have discharge openings and that the driving means for said cylinder, might also be in any appropriate form.

Having thus described my invention, what I claim as new and desire to secure by Letters Patent is:

1. A cleaning device comprising a revolubly mounted washing cylinder of foraminous formation and closed at one end, a concentrically arranged end wall for the other end thereof and of less diameter than the cylinder, spacing elements between said end wall and said cylinder, means for revolving the cylinder, a normally closed door for said cylinder, and means for directing a jet of water into the cylinder through the space around said end wall.

2. A cleaning device comprising a foraminous washing cylinder closed at one end and provided with a stub shaft on said end, a concentrically arranged end wall for the opposite end and of less diameter than the cylinder, spacing elements between said end wall and said cylinder, a stub shaft carried by said end wall, supporting bearings for the stub shafts, a normally closed door for the cylinder, means for rotating said cylinder, and means for directing a jet of water into the cylinder through the space surrounding said end wall.

3. A cleaning device comprising a supported rectangular frame having a bearing on each of its end bars, a foraminous washing cylinder having stub shafts revoluble in said bearings, means for rotating said cylinder, a normally closed door into said cylinder, means for feeding water to the interior of the cylinder, an inclined chute beneath the latter, and a semi-cylindrical receptacle surrounding the lower portion of the cylinder and resting upon the chute, said receptacle having notches in the free edges of its end walls for the reception of the stub shafts and longitudinally projecting studs on one edge for engagement with the tops of the ends of the frame.

4. A cleaning device comprising a supported rectangular frame, alined bearings on the opposite end bars thereof, a washing cylinder positioned between said end walls and having axial stub shafts revolubly mounted in said bearings, an inclined chute beneath said washing cylinder, a semi-cylindrical receptacle resting upon said chute and underlying the lower half of the washing cylinder, said receptacle having the upper edges of its end walls notched for the reception of said stub shafts, a longitudinal bead formed on one edge of said receptacle, a rod clamped on said bead and projecting beyond the opposite ends thereof, said projecting ends overlying said end bars of the frame and hook shaped catch members rising from said end bars of the frame and coacting with the projecting ends of said rod for yieldingly locking the receptacle against movement.

5. A cleaning device comprising a supported rectangular frame, alined bearings on the end bars thereof, a washing cylinder located between said end bars and having stub shafts revolubly mounted in said bearings, an inclined chute beneath the washing cylinder, a semi-cylindrical receptacle located beneath the lower half of said washing cylinder and having the upper edges of its end walls notched for the reception of said stub shafts, a longitudinal bead formed on one edge of said receptacle, the central portion of said bead and a portion of the edge of the receptacle adjacent thereto being notched whereby to form an overflow port, a rod secured in said bead and having its central portion projecting across said notch whereby to form a hand grip for the purpose of tilting the receptacle, the opposite ends of said rod projecting beyond the receptacle and overlying the end bars of the frame and hook shaped keepers rising from said end bars and coacting with said projecting ends of the rod to yieldingly retain said receptacle in upright and effective position.

In testimony whereof I have hereunto set my hand in presence of two subscribing witnesses.

JOHN N. HOFFMAN.

Witnesses:
W. W. IRELAND,
H. T. SHORT.

Copies of this patent may be obtained for five cents each, by addressing the "Commissioner of Patents, Washington, D. C."